US012664976B2

(12) United States Patent
Sharifi et al.

(10) Patent No.: US 12,664,976 B2
(45) Date of Patent: Jun. 23, 2026

(54) QUERY REPLAY FOR PERSONALIZED RESPONSES IN AN LLM POWERED ASSISTANT

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 216 days.

(21) Appl. No.: 18/391,524

(22) Filed: Dec. 20, 2023

(65) Prior Publication Data

US 2025/0210033 A1 Jun. 26, 2025

(51) Int. Cl.
*G10L 15/06* (2013.01)
*G10L 15/16* (2006.01)

(52) U.S. Cl.
CPC ............ *G10L 15/063* (2013.01); *G10L 15/16* (2013.01); *G10L 2015/0635* (2013.01)

(58) Field of Classification Search
CPC .................. G10L 15/063; G10L 15/16; G10L 2015/0635; G06F 16/90332; G06F 16/33295
See application file for complete search history.

(56) References Cited

U.S. PATENT DOCUMENTS 9,594,851 B1 * 3/2017 Chechik ............ G06F 16/90324
11,907,315 B1 * 2/2024 Cui ........................ H04L 67/535

| | | | |
|---|---|---|---|
| 2019/0108282 A1 * | 4/2019 | Zeng .................... | G06N 3/0455 |
| 2021/0350786 A1 * | 11/2021 | Chen .................... | G10L 15/063 |
| 2023/0027628 A1 | 1/2023 | Wu et al. | |
| 2025/0014607 A1 * | 1/2025 | Chen .................... | G11B 27/031 |
| 2025/0077511 A1 * | 3/2025 | Zhao .................... | G06F 16/252 |
| 2025/0124622 A1 * | 4/2025 | Bhakthavatsalam | ........................ G06F 40/186 |
| 2025/0131189 A1 * | 4/2025 | Safavi .................... | G06F 40/56 |

OTHER PUBLICATIONS

International Search Report and Written Opinion issued in related PCT Application No. PCT/US2024/056974, dated Mar. 12, 2025.

* cited by examiner

*Primary Examiner* — Michael Colucci
(74) *Attorney, Agent, or Firm* — Honigman LLP; Brett A. Krueger; Grant Griffith

(57) ABSTRACT

A method for personalizing responses includes receiving a natural language query from a user that solicits a response from an assistant large language model (LLM) and processing the natural language query to identify, from a log of refinement queries each previously input by the user for instructing the assistant LLM to refine a corresponding previous response generated by the assistant LLM, a preferred refinement query that is relevant to the natural language query. The method also includes prompting, using the natural language query and the preferred refinement query identified as being relevant to the natural language query, the assistant LLM to generate a personalized response to the natural language query. The method also includes providing, for output from a user device, the personalized response to the natural language query.

22 Claims, 8 Drawing Sheets

Figures 3A, 3B, 3C:
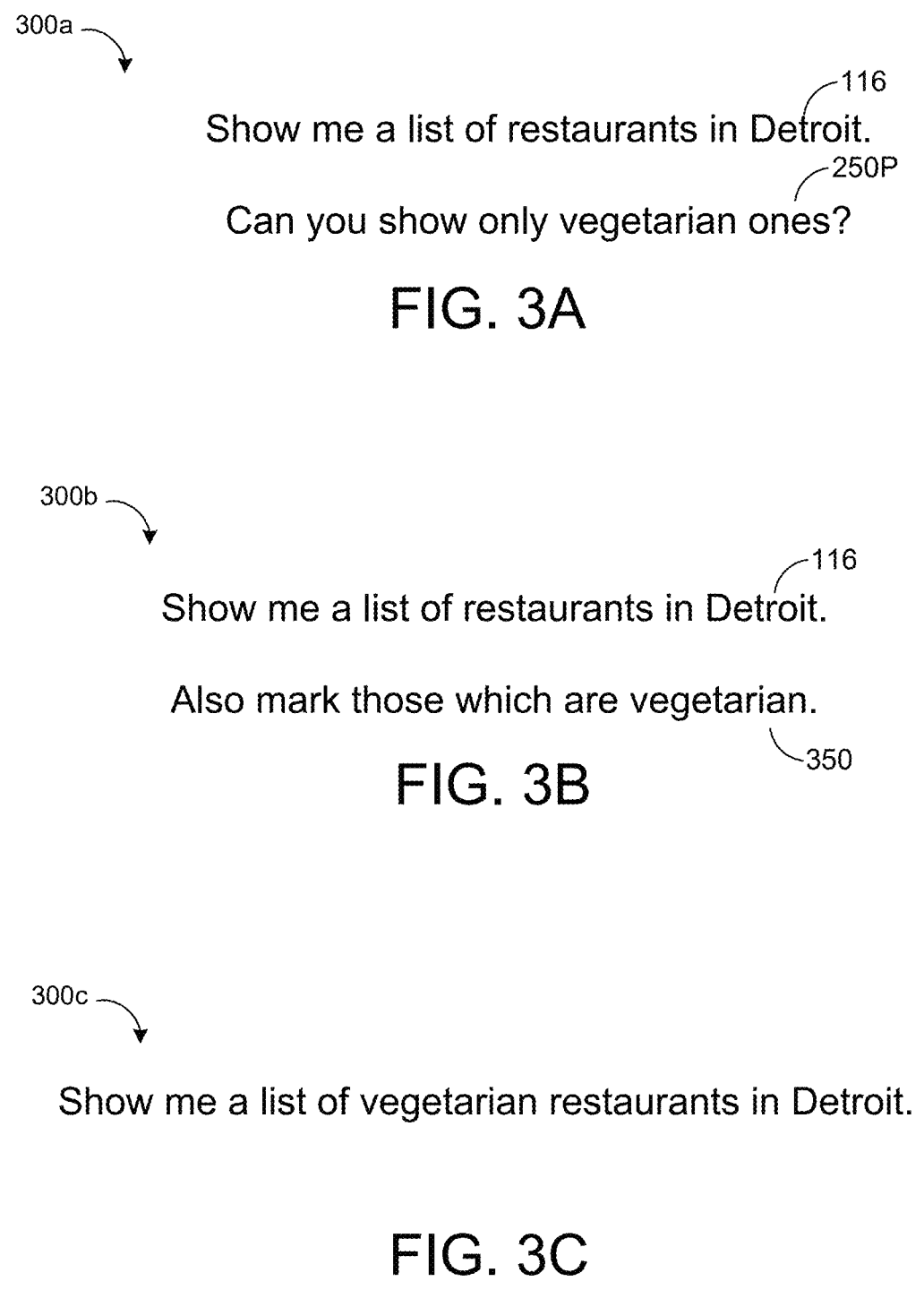

300a

116

Show me a list of restaurants in Detroit.

250P

Can you show only vegetarian ones?

Show me a list of restaurants in Detroit.

Also mark those which are vegetarian.

Show me a list of vegetarian restaurants in Detroit.

Figure 4B:
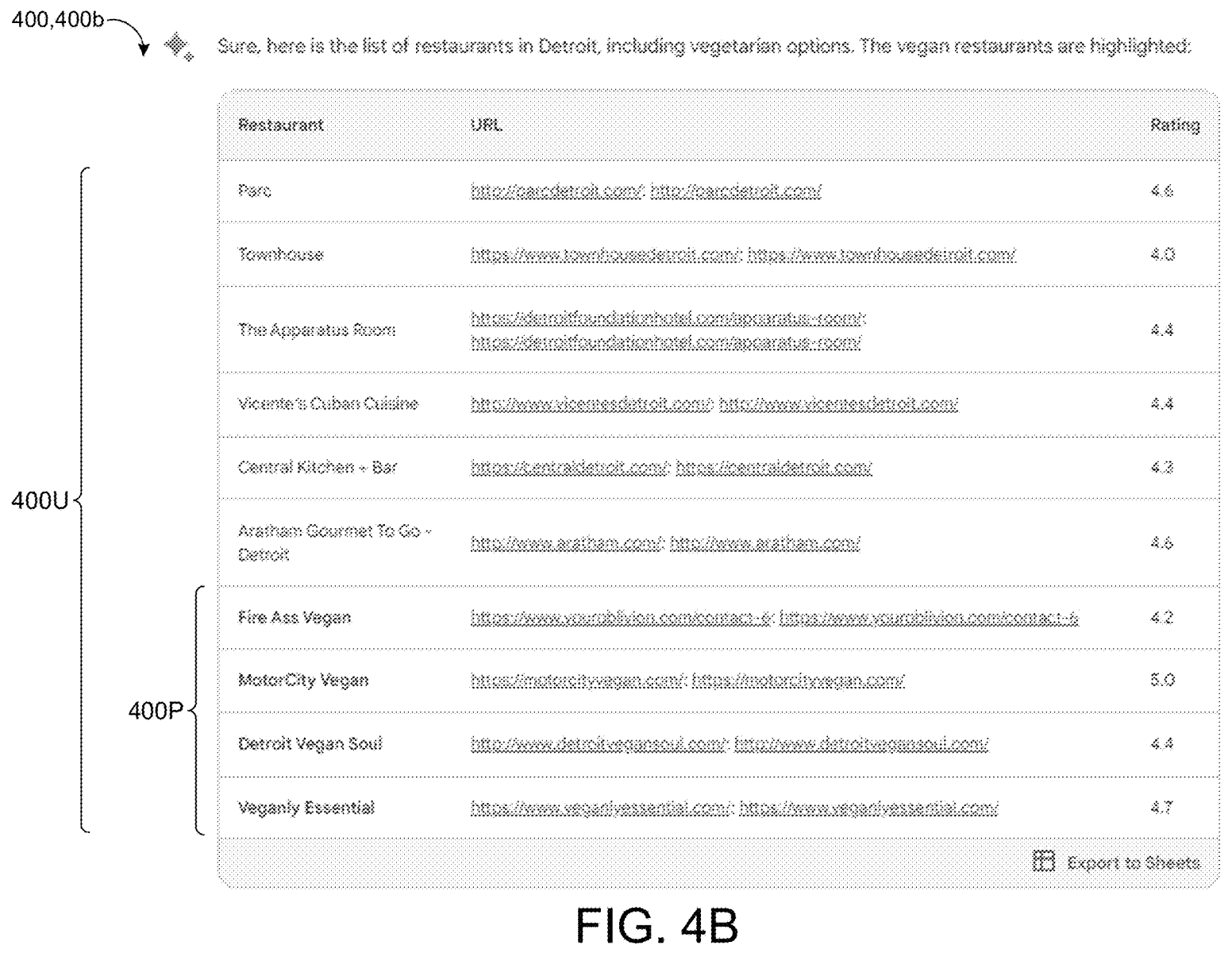

Sure, here is the list of restaurants in Detroit, including vegetarian options. The vegan restaurants are highlighted.

| Restaurant | URL | Rating |
|---|---|---|
| Parc | https://parcdetroit.com/ http://parcdetroit.com/ | 4.6 |
| Townhouse | https://www.townhousedetroit.com/ https://www.townhousedetroit.com/ | 4.0 |
| The Apparatus Room | https://detroitfoundationhotel.com/apparatus-room/ https://detroitfoundationhotel.com/ | 4.4 |
| Vicente's Cuban Cuisine | https://vicentesdetroit.com/ http://vicentesdetroit.com/ | 4.4 |
| Central Kitchen + Bar | https://centraldetroit.com/ https://centraldetroit.com/ | 4.3 |
| Anchor Gourmet To-Go - Detroit | https://www.anchorbar.com/ http://www.anchor.com/ | 4.6 |
| Fire Ass Vegan | https://www.soulfullyvegan.com/ https://soulfullyvegan.com/ | 4.2 |
| Motor-City Vegan | https://motorcityvegan.com/ | 5.0 |
| Detroit Vegan Soul | https://www.detroitvegansoul.com/ | 4.4 |
| Veganly Essential | https://www.veganlyessential.com/ https://www.veganlyessential.com/ | 4.7 |

☒ Export to Sheets

Here are some vegetarian restaurants in Detroit:

- Seva Detroit at 66 E Forest Ave, Detroit, MI 48201, USA. Vegetarian & vegan spot serving diverse comfort fare & smoothies in a casual atmosphere. It has a rating of 4.5 stars on Google Maps.

- Thai Vegan at 20199 Livernois, Detroit, MI 48221, USA. It has a rating of 4.6 stars on Google Maps.

- Fine Ass Vegan at 97 W Warren Ave, Detroit, MI 48201, USA. It has a rating of 4.3 stars on Google Maps.

- MotorCity Vegan at 1330 Plum St, Detroit, MI 48216, USA. It has a rating of 5 stars on Google Maps.

- Anthians Gourmet To Go - Detroit at 719 Griswold St #100, Detroit, MI 48226, USA. It has a rating of 4.6 stars on Google Maps.

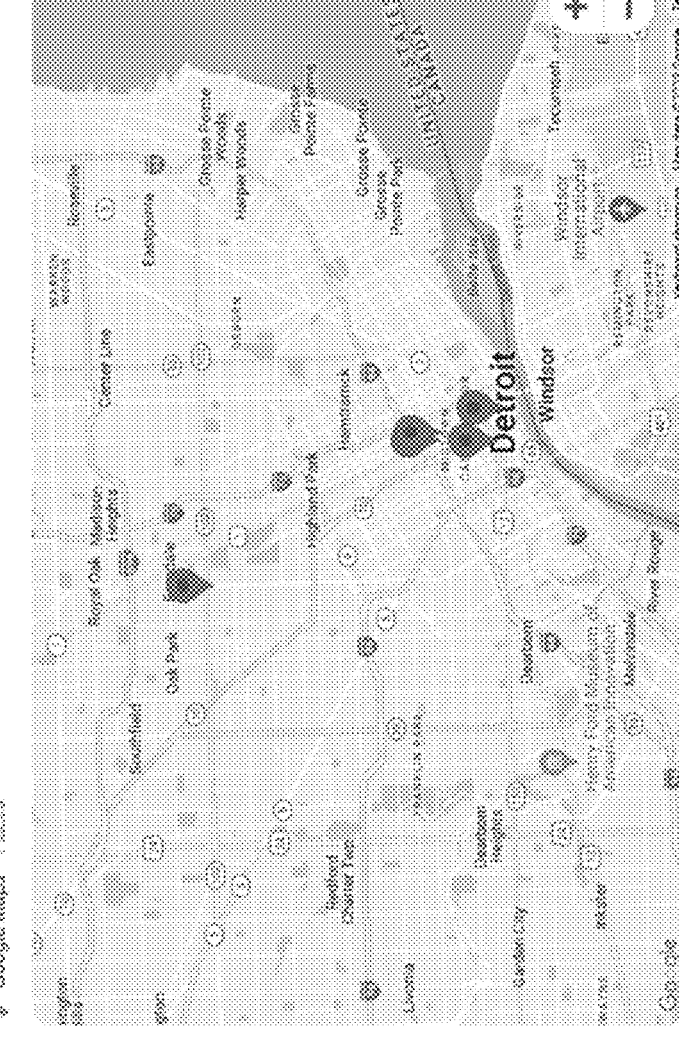

FIG. 4C

Receiving a natural language query from a user that solicits a response from an assistant LLM

*310*

Processing the natural language query to identify a preferred refinement query

*320*

Prompting the assistant LLM to generate a personalized response to the natural language query

*330*

Providing the personalized response to the natural language query

*340*

QUERY REPLAY FOR PERSONALIZED RESPONSES IN AN LLM POWERED ASSISTANT

TECHNICAL FIELD

This disclosure relates to query replay for personalized responses in an LLM powered assistant.

BACKGROUND

Users frequently interact with conversational assistant applications on smart devices such as phones, watches, vehicle infotainment systems, and smart speakers. These conversational assistant applications enable users to get things done and find answers to questions they might have, all through natural, conversational interactions. One key capability for conversational assistant applications relates to personalization. For instance, a user may have certain tastes/preferences and these tastes/preferences should be understood by the assistant and taken into account when serving responses to the user. While digital assistants powered by large language models (LLM) provide an opportunity to produce responses in a meaningful way that are more tailored to a user's personal preferences, it remains very difficult to make a clear decision about which preferences are permanent, which preferences may change over time, and which preferences are context dependent.

SUMMARY

One aspect of the disclosure provides a computer-implemented method executed on data processing hardware that causes the data processing hardware to perform operations that include: receiving a natural language query from a user that solicits a response from an assistant large language model (LLM); processing the natural language query to identify, from a log of refinement queries each previously input by the user for instructing the assistant LLM to refine a corresponding previous response generated by the assistant LLM, a preferred refinement query that is relevant to the natural language query; prompting, using the natural language query and the preferred refinement query identified as being relevant to the natural language query, the assistant LLM to generate a personalized response to the natural language query; and providing, for output from a user device, the personalized response to the natural language query.

Implementations of the disclosure may include one or more of the following optional features. In some implementations, receiving the natural language query includes receiving audio data characterizing an utterance of the natural language query spoken by the user and captured by the user device, and performing speech recognition on the audio data to generate a textual representation of the natural language query spoken by the user. In some examples, prompting the assistant LLM to generate the personalized response to the natural language query includes: during a first roundtrip, issuing, for input to the assistant LLM, the natural language query as an un-personalized prompt to cause the assistant LLM to generate an un-personalized response to the natural language query; and during a second roundtrip responsive to the assistant LLM generating the un-personalized response, issuing, for input to the assistant LLM, the preferred refinement query as a personalized prompt to cause the assistant LLM to generate the personalized response to the natural language query. In these examples, providing the personalized response to the natural language query may include providing, for output from the user device, response content that includes both the personalized response and the un-personalized response to the natural language query.

In some implementations, prompting the assistant LLM to generate the personalized response to the natural language query includes: structuring the preferred refinement query into a refinement prompt; structuring a composite prompt by concatenating the natural language query with the refinement prompt; and issuing, for input to the assistant LLM, the composite prompt to cause the assistant LLM to generate a base response to the natural language query that is not personalized for the user and augment the base response to convey personal preferences specified by the refinement prompt. Here, the personalized response includes the augmented response and the refinement prompt is specifically formulated for the assistant LLM to personalize base responses generated by the assistant LLM. In these implementations, structuring the preferred refinement query into the refinement prompt may include structuring the preferred refinement query into the refinement prompt by appending natural language personalized response instructions to a textual representation of the preferred refinement query. Additionally or alternatively, augmenting the base response may include at least one of highlighting information or results in the base response, annotating text in the base response, underlining or modifying text in the base response, or adjusting a formatting of the base response.

In some examples, each corresponding refinement query in the log of refinement queries includes a respective confidence value assigned to the corresponding refinement query and prompting the assistant LLM to generate the personalized response to the natural language query includes: determining the respective confidence value threshold assigned to the preferred refinement query satisfies a confidence threshold; based on determining the respective confidence value assigned to the preferred refinement query satisfies the confidence value threshold, structuring the natural language query and the preferred refinement query into a natural language composite prompt, the natural language composite prompt specifically formulated for instructing the assistant LLM to generate the personalized response to the natural language query; and issuing, for input to the assistant LLM, the natural language composite prompt to cause the assistant LLM to generate the personalized response to the natural language query. Notably, the natural language composite prompt may include a single sentence.

In some implementations, each corresponding refinement query in the log of refinement queries is paired with a respective previous query embedding of a corresponding previous query input by the user that prompted the assistant LLM to generate the corresponding previous response that was refined by the corresponding refinement query. Here, the respective previous query embedding of each corresponding previous query is projected into an embedding space. In these implementations, processing the natural language query to identify the preferred refinement query that is relevant to the natural language query includes: embedding, using a neural network, the natural language query into a query embedding; identifying, from the previous query embeddings projected into the embedding space, a closest one of the previous query embeddings to the query embedding within the embedding space; and selecting the refinement query in the log of refinement queries that is paired with the identified closest one of the previous query embeddings as the preferred refinement query.

In some examples, the operations also include receiving local context associated with the natural language query and augmenting the natural language query by concatenating the natural language query with the local context. Here, prompting the assistant LLM to generate the personalized response to the natural language query includes prompting, using the natural language query concatenated with the local context and the preferred refinement query, the assistant LLM to generate the personalized response to the natural language query. In these examples, the natural language query may include text and the local context may be concatenated in plain text with the natural language query. Moreover, the local context may include at least one of a recent activity history including previous queries input by the user and corresponding responses generated by the assistant LLM during a dialog session, geographical location data, site visits, recent documents from a private corpus, or recent user history information associated with the natural language query.

Another aspect of the disclosure provides a system that includes data processing hardware and memory hardware in communication with the data processing hardware. The memory hardware stores instructions that when executed on the data processing hardware cause the data processing hardware to perform operations that include: receiving a natural language query from a user that solicits a response from an assistant large language model (LLM); processing the natural language query to identify, from a log of refinement queries each previously input by the user for instructing the assistant LLM to refine a corresponding previous response generated by the assistant LLM, a preferred refinement query that is relevant to the natural language query; prompting, using the natural language query and the preferred refinement query identified as being relevant to the natural language query, the assistant LLM to generate a personalized response to the natural language query; and providing, for output from a user device, the personalized response to the natural language query.

This aspect may include one or more of the following optional features. In some implementations, receiving the natural language query includes receiving audio data characterizing an utterance of the natural language query spoken by the user and captured by the user device, and performing speech recognition on the audio data to generate a textual representation of the natural language query spoken by the user. In some examples, prompting the assistant LLM to generate the personalized response to the natural language query includes: during a first roundtrip, issuing, for input to the assistant LLM, the natural language query as an un-personalized prompt to cause the assistant LLM to generate an un-personalized response to the natural language query; and during a second roundtrip responsive to the assistant LLM generating the un-personalized response, issuing, for input to the assistant LLM, the preferred refinement query as a personalized prompt to cause the assistant LLM to generate the personalized response to the natural language query. In these examples, providing the personalized response to the natural language query may include providing, for output from the user device, response content that includes both the personalized response and the un-personalized response to the natural language query.

In some implementations, prompting the assistant LLM to generate the personalized response to the natural language query includes: structuring the preferred refinement query into a refinement prompt; structuring a composite prompt by concatenating the natural language query with the refinement prompt; and issuing, for input to the assistant LLM, the composite prompt to cause the assistant LLM to generate a base response to the natural language query that is not personalized for the user and augment the base response to convey personal preferences specified by the refinement prompt. Here, the personalized response includes the augmented response and the refinement prompt is specifically formulated for the assistant LLM to personalize base responses generated by the assistant LLM. In these implementations, structuring the preferred refinement query into the refinement prompt may include structuring the preferred refinement query into the refinement prompt by appending natural language personalized response instructions to a textual representation of the preferred refinement query. Additionally or alternatively, augmenting the base response may include at least one of highlighting information or results in the base response, annotating text in the base response, underlining or modifying text in the base response, or adjusting a formatting of the base response.

In some examples, each corresponding refinement query in the log of refinement queries includes a respective confidence value assigned to the corresponding refinement query and prompting the assistant LLM to generate the personalized response to the natural language query includes: determining the respective confidence value threshold assigned to the preferred refinement query satisfies a confidence threshold; based on determining the respective confidence value assigned to the preferred refinement query satisfies the confidence value threshold, structuring the natural language query and the preferred refinement query into a natural language composite prompt, the natural language composite prompt specifically formulated for instructing the assistant LLM to generate the personalized response to the natural language query; and issuing, for input to the assistant LLM, the natural language composite prompt to cause the assistant LLM to generate the personalized response to the natural language query. Notably, the natural language composite prompt may include a single sentence.

In some implementations, each corresponding refinement query in the log of refinement queries is paired with a respective previous query embedding of a corresponding previous query input by the user that prompted the assistant LLM to generate the corresponding previous response that was refined by the corresponding refinement query. Here, the respective previous query embedding of each corresponding previous query is projected into an embedding space. In these implementations, processing the natural language query to identify the preferred refinement query that is relevant to the natural language query includes: embedding, using a neural network, the natural language query into a query embedding; identifying, from the previous query embeddings projected into the embedding space, a closest one of the previous query embeddings to the query embedding within the embedding space; and selecting the refinement query in the log of refinement queries that is paired with the identified closest one of the previous query embeddings as the preferred refinement query.

In some examples, the operations also include receiving local context associated with the natural language query and augmenting the natural language query by concatenating the natural language query with the local context. Here, prompting the assistant LLM to generate the personalized response to the natural language query includes prompting, using the natural language query concatenated with the local context and the preferred refinement query, the assistant LLM to generate the personalized response to the natural language query. In these examples, the natural language query may include text and the local context may be concatenated in plain text with the natural language query. Moreover, the local context may include at least one of a recent activity history including previous queries input by the user and corresponding responses generated by the assistant LLM during a dialog session, geographical location data, site visits, recent documents from a private corpus, or recent user history information associated with the natural language query.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A-3C are example prompts structured by a prompt structurer for personalizing responses generated by an LLM.

FIGS. 4A-4C are examples of response content generated by an assistant LLM that conveys personalized responses.

Like reference symbols in the various drawings indicate like elements.

DETAILED DESCRIPTION

Figure 1:
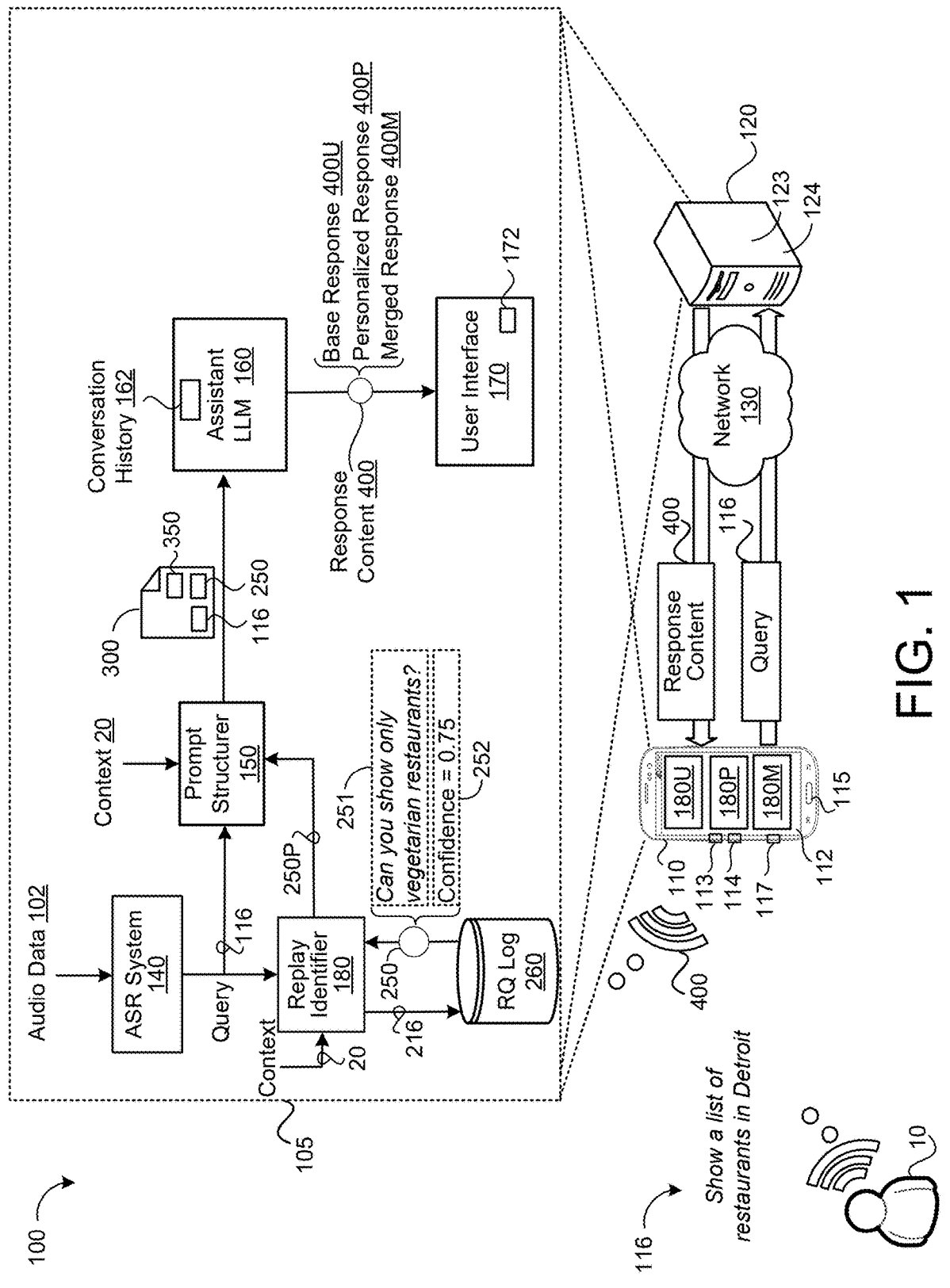
FIG. 1 is a schematic view of a system for applying preferred refinement queries for personalizing responses generated by an assistant large language model (LLM).

Humans may engage in human-to-computer dialogs with interactive software applications referred to as "chatbots," "voice bots", "automated assistants", "interactive personal assistants," "intelligent personal assistants," "conversational agents," etc. via a variety of computing devices. As one example, these chatbots may correspond to a machine learning model or a combination of different machine learning models, and may be utilized to perform various tasks on behalf of users.

Chatbots adopting Large language models (LLMs) are currently opening up a wide range of applications due to their powerful understanding and generation capabilities which can operate over text, image, and/or audio inputs. These models are also being extended with actuation capabilities via integration mechanisms with various service providers.

Users frequently interact with conversational assistant applications on smart devices such as phones, watches, vehicle infotainment systems, and smart speakers. These conversational assistant applications enable users to get things done and find answers to questions they might have, all through natural, conversational interactions. Large language models (LLMs) show huge potential to become the main technical component in the next generation of conversational assistants due to their generality and performance at a wide range of tasks including summarization, writing, tool use, and more.

One key capability for conversational assistant applications (whether LLM-based or not) relates to personalization. In particular, a user may have certain tastes/preferences and these tastes/preferences should be understood by the assistant and taken into account when serving responses to the user. For instance, a user may enjoy eating Italian food, may prefer assistant responses in a certain writing style in certain contexts or even generally, and may have certain personal preferences such as health or dietary restrictions. To provide the most optimal user experience, these preferences/tastes should be understood by the conversational assistant and taken into account when conversing with the user.

While digital assistants powered by large language models (LLM) provide an opportunity to produce responses in a meaningful way that are more tailored to a user's personal preferences, it remains very difficult to make a clear decision about which preferences are permanent, which preferences may change over time, and which preferences are context dependent. For instance, if a user asks the conversational assistant for a list of vegetarian restaurants, the user may be vegetarian or this may be a context dependent preference, e.g., based on who the user is eating with. Accordingly, it may be difficult to make an inference about some preferences being a hard preference in future conversations with the user. Similarly, some user preferences may change over time.

Implementations herein are directed toward personalizing responses generated by an assistant LLM for a user during conversations between the user and the assistant LLM. Specifically, implementations are directed toward a query replay technique that automatically applies a preferred refinement query that is relevant to a natural language query input by the user to the assistant LLM to cause the assistant LLM to generate a response to the current query that is personalized for the user. Techniques disclosed herein include processing the natural language query from the user to identify, from a log of refinement queries each previously input by the user for instructing the assistant LLM to refine a corresponding previous response generated by the assistant LLM, the preferred refinement query that is relevant to the natural language query. Thereafter, implementations disclosed herein include the query replay technique using the natural language query and the preferred refinement query to prompt the assistant LLM to generate the personalized response to the natural language query. The personalized response may be provided for output from a user device associated with the user. For instance, results associated with the personalized response may be graphically presented for display in a user interface executing on the user device. Optionally, the personalized response may be audibly output from the user device as synthesized speech in addition to or in lieu of graphically presenting the personalized response. In some examples, a base or un-personalized response is also generated by the assistant LLM and presented concurrently with the personalized response. While the un-personalized response generated by the assistant LLM is responsive to the natural language query, the un-personalized response is not refined by any relevant refinement queries conveying preferences of the user.

As will become apparent, by applying the refinement query that is relevant to the current query, the query replay technique applies the refinement query automatically without input from the user so that the user does not have to constantly re-iterate his/her preferences through manual input of refinement queries. As such, the user experience of interacting with the assistant LLM is improved since the responses produced by the assistant LLM are personalized for the user based on the user's preferences conveyed by the relevant refinement query and time is saved on the user's behalf since the user does not have to constantly re-iterate their preferences by issuing refinement queries after an initial un-personalized response is generated by the assistant LLM.

FIG. 1 illustrates an example system 100 for allowing a spoken conversation between a user 10 and an assistant LLM 160. A conversational assistant application 105 may execute on a user device 110 associated with the user 10 to enable the user 10 and the assistant LLM 160 to interact with one another through spoken conversation. The conversational assistant application 105 may access various components for facilitating the spoken conversation in a natural manner between the user 10 and the assistant LLM 160. For instance, through the use of application programming interfaces (APIs) or other types of plug-ins, the conversation assistant application 105 may access an automated speech recognition (ASR) system 140, a replay identifier 180, a prompt structurer 150, the assistant LLM 160, and a user interface 170.

During a user turn of the spoken conversation between the user 10 and the assistant LLM 160, the user device 110 captures audio data 102 characterizing an utterance of a query 116 spoken by the user 10 and directed toward the assistant LLM 160 to solicit a response from the assistant LLM 160. The query 116 may specify a particular task that the user 10 requests the assistant LLM 160 to perform on the user's behalf. For instance, the query 116 may request the assistant LLM 160 to obtain information about a specific topic, the query 116 may request the assistant LLM 160 to generate text about a specific topic/theme, or the query 116 may include a question that the user 10 would like the assistant LLM 160 to answer.

In some examples, the user 10 speaks the utterance of the query 116 in natural language and the ASR system 140 performs speech recognition on the audio data 102 characterizing the utterance of the query 116 to generate a textual representation of the query 116 spoken by the user 10. The textual representation of the query 116 may be simply referred to as the natural language query 116. In other examples, in lieu of spoken input, the user 10 inputs a textual representation of the natural language query 116 via the user interface 170 executing on the user device 110. For instance, the textual representation of the natural language query 116 may be input by the user via a keyboard or other input device in communication with the user interface 170. Optionally, the textual representation of the natural language query 116 may be one of multiple suggested queries displayed on a screen 112 of the user device 110 that the user may select.

Thereafter, the replay identifier 180 processes the natural language query 116 to identify, from a log 260 (also referred to as "refinement query log 260" or "RQ log 260") of refinement queries 250 each previously input by the user 10 for instructing the assistant LLM 160 to refine a corresponding previous response generated by the assistant LLM 160, a preferred refinement query 250P that is relevant to the natural language query 116. The replay identifier 180 may process the textual representation of the natural language query 116 by embedding the textual representation of the natural language query 116 into a corresponding query embedding 216, and use the corresponding query embedding 216 to retrieve one or more relevant refinement queries 250 from the refinement query log 260.

Figure 2:
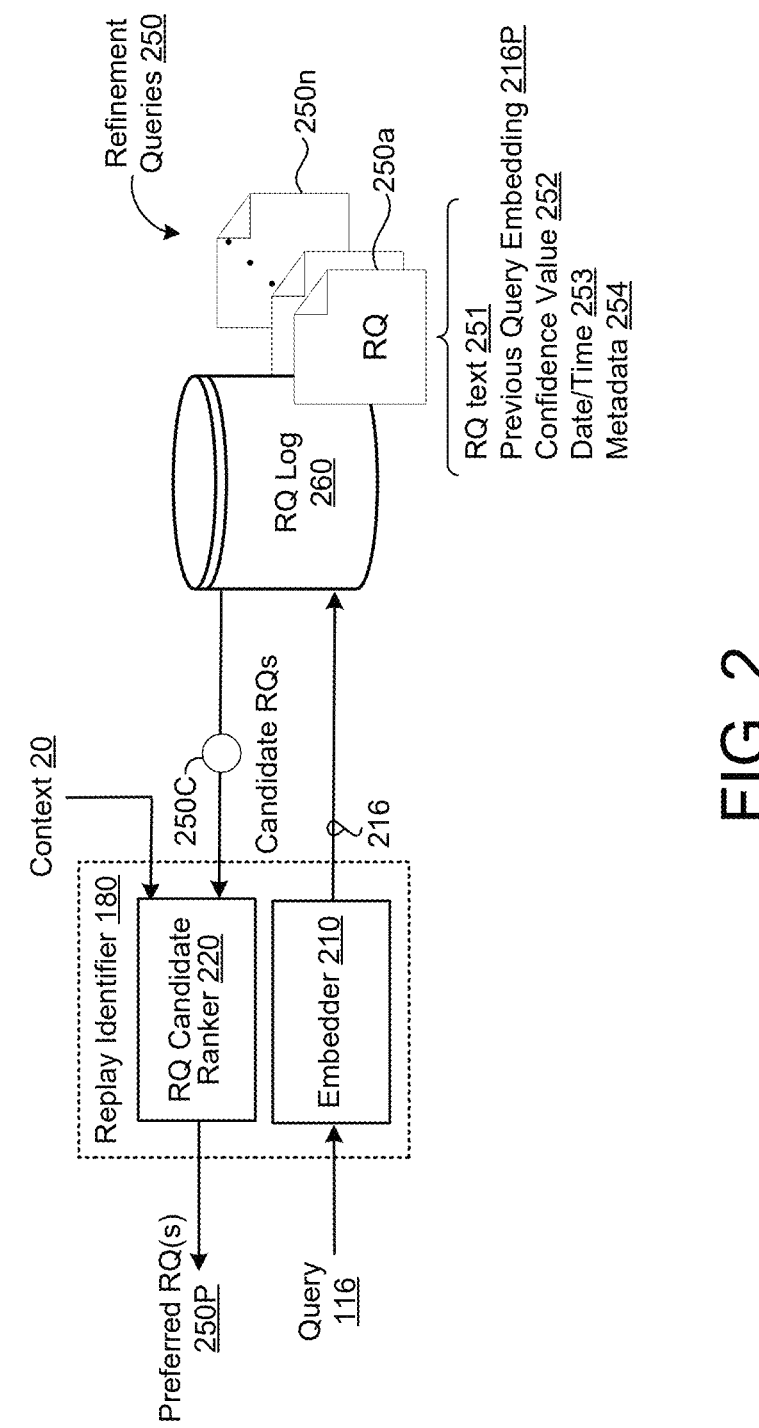
FIG. 2 is a schematic view of an example refinement query identifier for identifying refinement queries previously input by a user that are relevant to a current natural language query input by the user.

FIG. 2 shows a schematic view 200 of the replay identifier 180 identifying the preferred refinement query 250P from the refinement query log 260. The replay identifier 180 includes an embedder 210 configured to embed the natural language query 116 into the query embedding 216. The embedder may include a neural network trained to convert natural language text into corresponding query embeddings. For two natural language queries 116 that convey similar linguistic content, the neural network 210 is trained to generate query embeddings 216 having values close to one another within an embedding space. Conversely, for two natural language queries 116 conveying different linguistic content or meaning, the neural network 210 is trained to generate query embeddings 216 having values that are far from one another within the embedding space.

The refinement query log 260 stores a plurality of refinement queries 250, 250a-n each previously input by the user 10 to refine a corresponding previous response generated by the assistant LLM 160. That is, each corresponding previous response generated by the assistant LLM 160 is responsive to a corresponding previous query input by the user 10. Each corresponding refinement query 250 stored in the refinement query log 260 is paired with a respective previous query embedding 216P for the corresponding previous user query input by the user 10 that prompted the assistant LLM 160 to generate the corresponding previous response that was refined by the corresponding refinement query 250. As a non-limiting example, the previous query input by the user 10 may include "Show me Restaurants in San Francisco" and the previous response generated by the assistant LLM 160 may include a list of results including the names and addresses of all the restaurants in San Francisco. Continuing with the example, the refinement query 250 previously input by the user for instructing the assistant LLM to refine the previous response listing the restaurants in San Francisco may include "Can you show only vegetarian ones?" As such, the refinement query 250 is paired with a previous query embedding 216P for the previous user query of "Show me Restaurants in San Francisco". Each previous query embedding 216P may be projected into the same embedding space as the query embedding 216 generated for the current natural language query 116. Moreover, each refinement query 250 stored in the RQ log 260 may include refinement query (RQ) text 251 (e.g., can you show only vegetarian ones) characterizing the refinement query 250, the previous query embedding 216P paired with the refinement query 250, a confidence value 252 assigned to the refinement query 250 by the replay identifier 180, and/or dates/times 253 indicating when the previous query embedding 216P was last used. Each RQ 250 may also include metadata 254 indicating other information about the refinement query 250 that may be helpful for determining whether or not the refinement query 250 is relevant to the current natural language query 116. For instance, the metadata 254 may include an activity (e.g., driving, walking, etc.) the user 10 was performing when the user input the refinement query 250, a modality for how the user 10 input the refinement query 250 (e.g., through spoken input or typed input), a type of user device (e.g., smart phone, desktop/laptop, tablet, smart speaker, vehicle infotainment, etc.) the user 10 was using to interact with the assistant LLM when the refinement query 250 was input, or any other contextual information such as a history of the previous conversation in which the refinement query 250 was input by the user.

The RQ log 260 may only store refinement queries 250 input by the user 10 within a predetermined time range. The confidence value 252 for each corresponding refinement query 250 may be updated dynamically by the replay identifier 180 based on how frequently the user 10 has input the corresponding refinement query 250 and how recent the corresponding refinement query 250 was last input by the user 10 relative to the current natural language query 116.

After using the embedder neural network 210 to embed the natural language query 116 into the query embedding 116 projected into the embedding space, the replay identifier 180 processes the natural language query 116 to identify the preferred refinement query 250P (or multiple preferred refinement queries 250P) that is relevant to the natural language query 116 by identifying one or more previous query embeddings 216P that are closest to the query embedding 216 and selecting the refinement queries 250 from the refinement query log 260 that are paired with the identified previous query embeddings 216P closest to the current query embedding 216P within the embedding space as candidate refinement queries 250C. In some examples, the replay identifier 180 calculates a respective distance between the current query embedding 216 and each previous query embedding 216P and identifies the one or more previous query embeddings 216P that are closest to the current query embedding 216 as those with respective distances that satisfy a distance threshold. For instance, the respective distance between the current embedding 216 and each previous query embedding 216P within the embedding space may include a respective cosine distance and the distance threshold may include a cosine distance threshold. Shorter distances between the current embedding 216 and previous query embeddings 216P within the embedding space indicate previous query embeddings 216P that are closer to the current query embedding 216, and thus more similar/contextually relevant to the current natural language query 116. In some scenarios, the replay identifier 180 simply selects the refinement query 250 paired with the previous query embedding 216P that is identified as being closest (e.g., having the shortest respective distance) to the current query embedding 216 within the embedding space as the preferred refinement query 250P provided to the prompt structurer 150. Moreover, the replay identifier 180 may further adjust the confidence value 252 based on a function of the respective distance within the embedding space between the current query embedding 216 and the previous query embedding 216P paired with the corresponding refinement query 250. For instance, the confidence value 252 may be boosted for those refinement queries 250 paired with previous query embeddings 216P that are closer to the current query embedding 216 within the embedding space.

In scenarios when the replay identifier 180 selects multiple candidate refinement queries 250C as being relevant to the current natural language query, the replay identifier 180 may apply an RQ candidate ranker 220 to rank each candidate refinement query 250C. Here, the RQ candidate ranker 220 processes the RQ text 251 and the confidence value 252 of each candidate refinement query 250 selected and ranks the candidate refinement queries 250C in order of which ones most accurately portray the user's current preferences and which ones the user 10 would most likely re-iterate during a follow-up refinement to a base response 400U the assistant LLM 160 would generate for the current natural language query 116. The RQ candidate ranker 220 may include a LLM that is pre-trained to process each candidate refinement query 250C (including the RQ text 251, the confidence value 252, and optionally the date/time 253 and metadata 254) and output the ranked list of candidate refinement queries 250C. The LLM-based RQ candidate ranker 220 may additionally process context 20 associated with the natural language query 116 such as, without limitation, the natural language query 116, a conversation history of the current conversation between the user 10 and the assistant LLM 160, a location of the user, contacts, user profile information, a modality at which the user 10 input the query 116 (e.g., speech input or typed input), an activity the user 10 is performing at the time the query 116 is input by the user 10, or even a type of the user device 110 (e.g., smart phone, desktop/laptop, tablet, smart speaker, vehicle infotainment, etc.) the user 10 is using to interact with the assistant LLM 160. In some implementations, the LLM-based RQ candidate ranker 220 includes a pre-trained reward-model (RM) for re-ranking. In these implementations, candidate refinement queries 250C selected by the RQ identifier 180 that are associated with high confidence values 252 (i.e., confidence values that satisfy a confidence value threshold) may be paired with the current natural language query 116 for use in fine-tuning the RM via reinforcement learning. For instance, user feedback indicating whether the personalized response 400P generated by the LLM 150 using one or more preferred refinement queries 250C was positive or negative may be used to fine-tune the RM through reinforcement learning.

In some examples, RQ candidate ranker 220 selects the highest ranked candidate refinement query 250C as the preferred refinement query 250P fed to the prompt structurer 150. In other examples, the RQ candidate ranker 220 provides the ranked list of candidate refinement queries 250 as preferred refinement queries 250P (including at least the RQ text 251 and the confidence value 252) to the prompt structurer 150 for use in prompting the assistant LLM 160. The RQ candidate ranker 220 may exclude lower ranking candidate refinement queries 250C from being selected as preferred refinement queries 250P fed to the prompt structurer 150. For instance, for the current natural language query 116 of "Show me a list of restaurants in Detroit", the candidate refinement queries 250C identified by the replay identifier 180 may include "show me ones on the ocean", "can you show only vegetarian ones?", and "which ones allow children". Here, the RQ candidate ranker 220 may exclude the refinement query 250 including the RQ text 251 "show me ones on the ocean" since this refinement query is not contextually relevant to the current natural language query 116 because the city of Detroit is not a coastal city near any ocean.

Referring back to FIG. 1, after the replay identifier 180 identifies the preferred refinement query 250P that is relevant (or multiple preferred refinement queries 250P that are relevant) to the natural language query, the prompt structurer uses the natural language query 116 and the preferred refinement query 250P to structure a personalization prompt 300 for prompting the assistant LLM 160 to generate the personalized response 400P to the natural language query 116. For simplicity, a single preferred refinement query 250P is identified and fed to the prompt structurer 150. However, the present disclosure is non-limiting and will be understood that one or more preferred refinement queries 250P may be identified and fed to the prompt structurer 150 for structuring a prompt for personalizing responses generated by the assistant LLM 160.

Figure 4A:
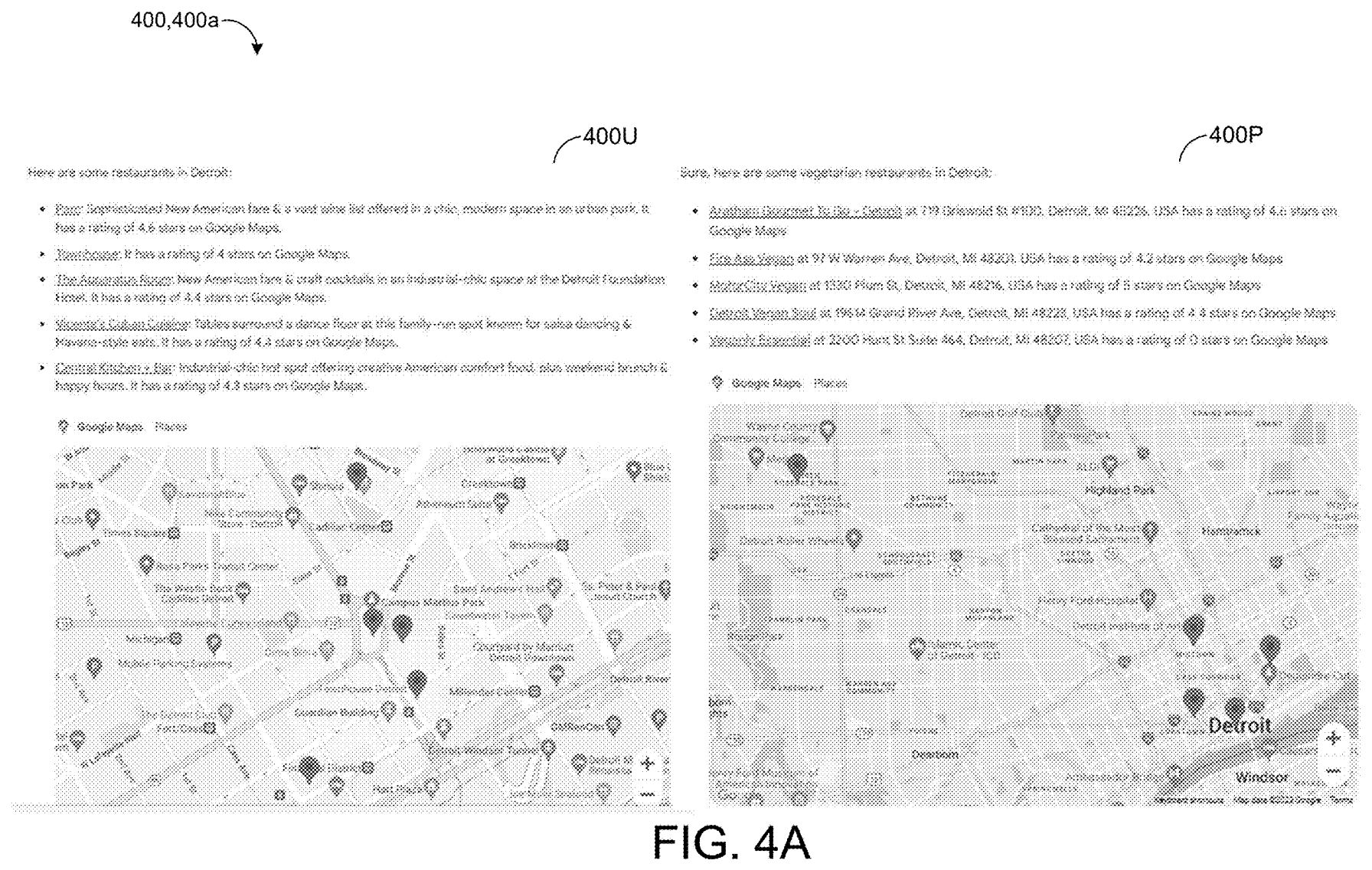

The prompt structurer 150 may structure different types of personalization prompts 300 using the preferred refinement query 250P based on the confidence value 252 of the preferred refinement query 250P. For instance and continuing with the example, when the confidence value 252 fails to satisfy a first confidence value threshold, the prompt structurer 150 may structure a two-part personalization prompt 300, 300a that simply includes the natural language query 116 ("Show me restaurants in Detroit") as an unpersonalized prompt and the preferred refinement query 250P ("Can you show only vegetarian ones?") as a personalized prompt as shown in FIG. 3A. Here, the conversational assistant application 105 issues, as input to the assistant LLM 160, the natural language query 116 as the un-personalized prompt to cause the assistant LLM 160 to generate an un-personalized response 400U to the natural language query 116 during a first round trip. During a second roundtrip responsive to the assistant LLM 160 generating the un-personalized response, the conversational assistant application 105 issues, as input to the assistant LLM 160, the preferred refinement query 250P as the personalized prompt to cause the assistant LLM to generate the personalized response 400P to the natural language query. Notably, the preferred refinement query 250P is issued during the second roundtrip automatically without the user providing any additional input after the natural language query 116. The two-part personalization prompt 300a results in the assistant LLM 160 generating response content 400 in two parts by outputting the un-personalized response 400U generated during the first round trip and separately outputting the personalized response 400P generated during the second round trip. FIG. 4A shows an example of the response content 400a including the un-personalized response 400U output for display on a screen of the user device and also the personalized response 400P output for display on the screen of the user device. Advantageously, since the confidence value 252 for the preferred refinement query 250P does not satisfy the first confidence threshold value, the two-part personalization prompt 300a results in the user being served both responses 400U, 400P separately so that the user's preference for vegetarian restaurants is shown without excluding other restaurants that may be non-vegetarian in case the user is interested. Notably, if the user issues a follow-up prompt directed toward the personalized response 400P, or otherwise interacts with the personalized results presented in the personalized response 400P, the replay identifier 180 may increase the confidence value 252 associated with the preferred refinement query 250P (or decrease the confidence value 252 if the user interacts with the un-personalized response 400U.

In another implementation, when the confidence value 252 associated with the preferred refinement query 250P satisfies the first confidence value threshold but does not satisfy a second confidence value threshold greater than the first confidence value threshold, the prompt structurer 150 structures the preferred refinement query 250P into a refinement prompt 350 and then structures a composite prompt 300, 300b by concatenating the natural language query 116 with the refinement prompt 350 as shown in FIG. 3B. The composite prompt 300b may include the natural language query 116 as a first sentence and the refinement prompt 350 as a second sentence. The refinement prompt 350 structured by the prompt structurer 150 is specifically formulated for the assistant LLM to personalize base responses generated by the assistant LLM during a single roundtrip. That is, the prompt structurer 150 appends natural language personalized response instructions ("Also mark those that are") to a textual representation of the preferred refinement query 250P ("vegetarian"). For instance, and continuing with the example, the prompt structurer 150 structures the preferred refinement query 250P of "show me the vegetarian ones" into the refinement prompt 350 of "Also mark those which are vegetarian". Thereafter, the conversational assistant application 105 issues, for input to the assistant LLM 160, the composite prompt 300b to cause the assistant LLM 160 to: generate a base response (un-personalized response 400U) to the natural language query 116; and augment the base response to convey personal preferences (e.g., vegetarian restaurants) specified by the refinement prompt 350. Here, the augmented base response includes the personalized response 400P. The composite prompt 300b issued to the assistant LLM 160 results in the assistant LLM 160 generating response content 400 by merging the un-personalized response 400U and the personalized response 400P into a single response. Notably, latency and computational costs are reduced by prompting the assistant LLM 160 with the composite prompt 300b compared to the two-part prompt 300a that requires two roundtrips to be performed by the LLM 160.

FIG. 4B shows an example of the response content 400b that merges the un-personalized response (i.e., base response) 400U and the personalized response 400B by augmenting the un-personalized base response 400U to convey the user preferences specified by the refinement query 350. In the example shown, the response content 400b output for display on the screen of the user device 110 whereby the vegetarian restaurants for the personalized response 400P are augmented by highlighting their names in bold text. Augmenting may additionally or alternatively include annotating text in the base response (e.g., adding an asterisk), underlining or modifying text in the base response, adjusting a formatting of the base response, or any other form of augmenting the base response to convey the user's preferences. Notably, if the user issues a follow-up prompt directed toward the personalized response 400P, or otherwise interacts with the personalized results presented in the personalized response 400P, the replay identifier 180 may increase the confidence value 252 associated with the preferred refinement query 250P (or decrease the confidence value 252 if the user interacts with the un-personalized response 400U).

In yet another implementation, when the confidence value 252 associated with the preferred refinement query 250P satisfies both the first confidence value threshold and the second confidence value threshold greater than the first confidence value threshold, the prompt structurer 150 structures the natural language query 116 and the preferred refinement query 250P into a natural language composite prompt 300, 300c that is specifically formulated for instructing the assistant LLM 160 to generate the personalized response 400P. Continuing with the example above, FIG. 3C shows an example natural language composite prompt 300c structured from the preferred refinement query 250P and the natural language query 116 by the prompt structurer 150 based on the confidence value 252 assigned to the preferred refinement query 250P. Here, the prompt structurer 150 structures the natural language composite prompt 300c as a new sentence instructing the assistant LLM 160 "show me a list of vegetarian restaurants in Detroit". The natural language composite prompt 300c issued to the assistant LLM 160 results in the assistant LLM 160 generating response content 400 that includes the personalized response 400P conveying the user's preferences without the need to include un-personalized results. The value of the second confidence value threshold may be selected such that a confidence value 252 satisfying the second confidence value threshold is a highly-confident indication that the user 10 wants the personalized search results conveying the user's preference(s) conveyed by the preferred refinement query 250P. Notably, the prompt structurer 150 generates the natural language composite prompt 300c as a single sentence, and thus uses fewer tokens than the prompts 300a, 300b of FIGS. 3A and 3B. FIG. 4C shows an example of the response content 400c that includes the personalized response 400P without including un-personalized results.

Referring back to FIG. 1, the prompt structurer 150 and/or the assistant LLM 160 may further consider additional context 20 such as, without limitation, the natural language query 116, a conversation history of the current conversation between the user 10 and the assistant LLM 160, a location of the user, contacts, user profile information, a modality at which the user 10 input the query 116 (e.g., speech input or typed input), an activity the user 10 is performing at the time the query 116 is input by the user 10, or even a type of the user device 110 (e.g., smart phone, desktop/laptop, tablet, smart speaker, vehicle infotainment, etc.) the user 10 is using to interact with the assistant LLM 160.

Figure 5:
FIG. 5 is a flowchart of an example arrangement of operations for a method of applying preferred refinement queries for personalizing responses generated by an assistant LLM.
Figure 5:
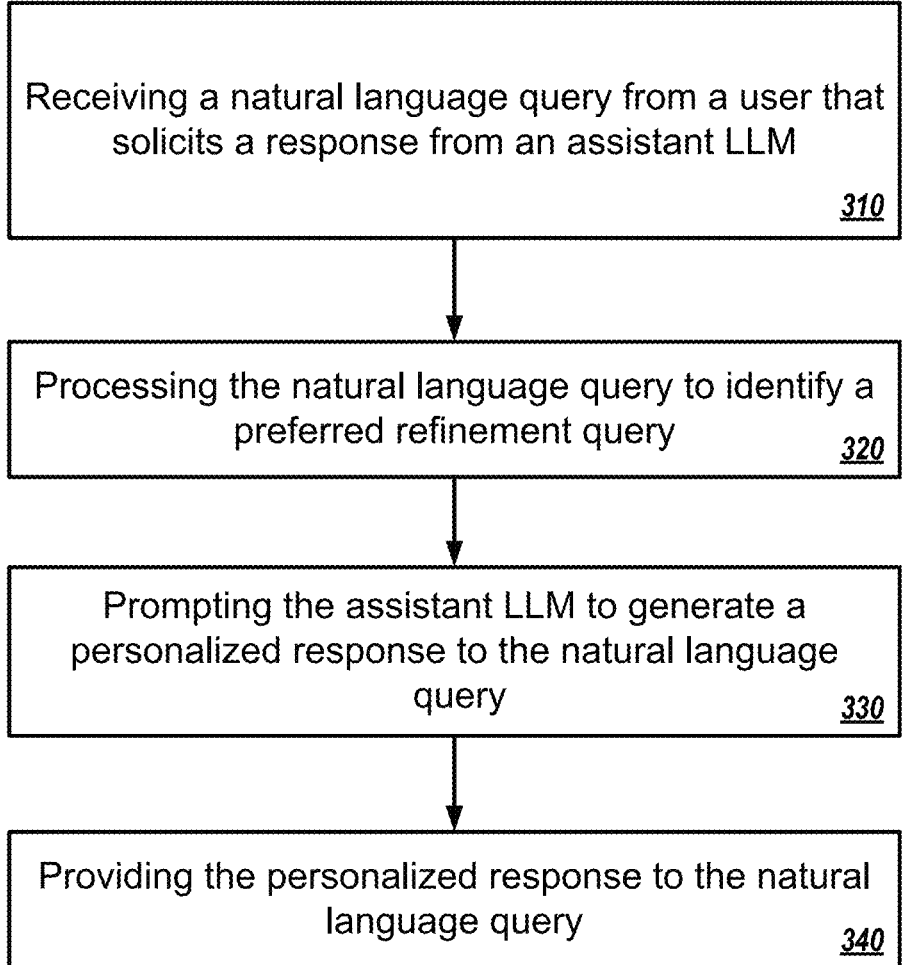

FIG. 5 is a flowchart of an example arrangement of operations for a method 500 of automatically applying a preferred refinement query 250 that is relevant to a natural language query input by a user to cause an assistant LLM 160 to generate a personalized response 400P conveying user preferences specified by the refinement query 250. The method 500 may execute on data processing hardware 610 (FIG. 6) (e.g., data processing hardware 113 of the user device 110 or data processing hardware 123 of the remote server 120) based on instructions stored on memory hardware 620 (FIG. 6) (e.g., memory hardware 114 of the user device 110 or memory hardware 124 of the remote server 120). At operation 510, the method 500 includes receiving a natural language query 116 from a user 10 that solicits a response from the assistant LLM 160.

At operation 520, the method 500 includes processing the natural language query 116 to identify, from a log 260 of refinement queries 250, a preferred refinement query 250P that is relevant to the natural language query 116. Each refinement query 250 in the log 260 of refinement queries 250 was previously input by the user 10 for instructing the assistant LLM 160 to refine a corresponding previous response generated by the assistant LLM 160.

At operation 530, the method 500 includes prompting, using the natural language query 116 and the preferred refinement query 250P identified as being relevant to the natural language query 116, the assistant LLM 160 to generate a personalized response 400P to the natural language query 116. At operation 540, the method 500 also includes providing, for output from a user device 110, the personalized response 400P to the natural language query 116.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
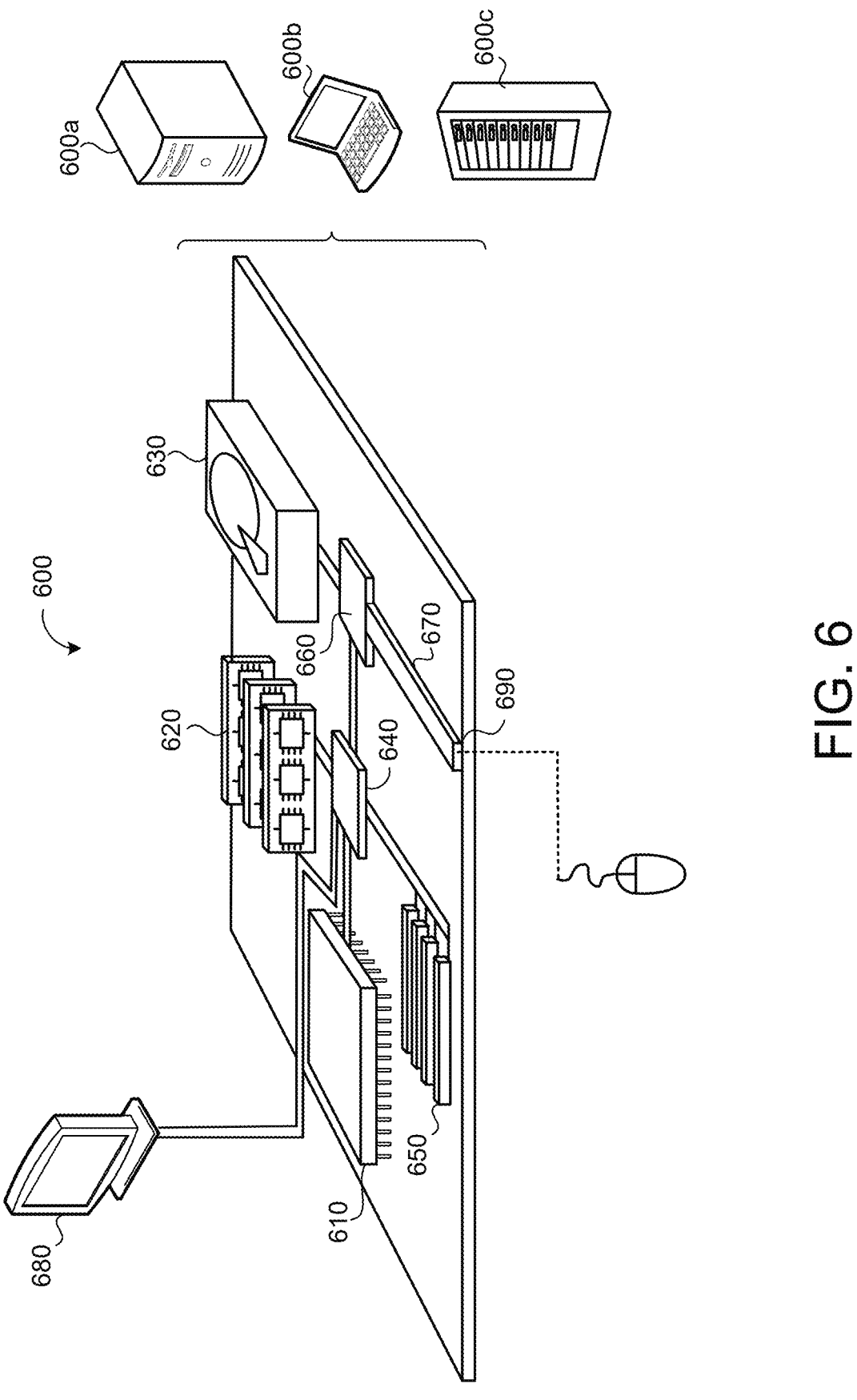
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

receiving a natural language query from a user that solicits a response from an assistant large language model (LLM);

processing the natural language query to identify, from a log of refinement queries each previously input by the user for instructing the assistant LLM to refine a corresponding previous response generated by the assistant LLM, a preferred refinement query that is relevant to the natural language query;

prompting, using the natural language query and the preferred refinement query identified as being relevant to the natural language query, the assistant LLM to generate a personalized response to the natural language query; and providing, for output from a user device, the personalized response to the natural language query, wherein prompting the assistant LLM to generate the personalized response to the natural language query comprises:

structuring the preferred refinement query into a refinement prompt, the refinement prompt specifically formulated for the assistant LLM to personalize base responses generated by the assistant LLM;

structuring a composite prompt by concatenating the natural language query with the refinement prompt; and issuing, for input to the assistant LLM, the composite prompt to cause the assistant LLM to:

generate a base response to the natural language query, the base response not personalized for the user; and augment the base response to convey personal preferences specified by the refinement prompt, wherein the personalized response comprises the augmented base response.

2. The computer-implemented method of claim 1, wherein receiving the natural language query comprises:

receiving audio data characterizing an utterance of the natural language query spoken by the user and captured by the user device; and performing speech recognition on the audio data to generate a textual representation of the natural language query spoken by the user.

3. The computer-implemented method of claim 1, wherein providing the personalized response to the natural language query comprises providing, for output from the user device, response content comprising both the personalized response and the base response to the natural language query.

4. The computer-implemented method of claim 1, wherein structuring the preferred refinement query into the refinement prompt comprises structuring the preferred refinement query into the refinement prompt by appending natural language personalized response instructions to a textual representation of the preferred refinement query.

5. The computer-implemented method of claim 1, wherein augmenting the base response comprises at least one of:

highlighting information or results in the base response;

annotating text in the base response;

underlining or modifying text in the base response; or adjusting a formatting of the base response.

6. The computer-implemented method of claim 1, wherein:

each corresponding refinement query in the log of refinement queries is paired with a respective previous query embedding of a corresponding previous query input by the user that prompted the assistant LLM to generate the corresponding previous response that was refined by the corresponding refinement query, the respective previous query embedding of each corresponding previous query projected into an embedding space; and processing the natural language query to identify the preferred refinement query that is relevant to the natural language query comprises:

embedding, using a neural network, the natural language query into a query embedding;

identifying, from the previous query embeddings projected into the embedding space, a closest one of the previous query embeddings to the query embedding within the embedding space; and selecting the refinement query in the log of refinement queries that is paired with the identified closest one of the previous query embeddings as the preferred refinement query.

7. The computer-implemented method of claim 1, wherein the operations further comprise:

receiving local context associated with the natural language query, wherein structuring the composite prompt by concatenating the natural language query with the refinement prompt further comprises structuring the composite prompt by concatenating the natural language query with the refinement prompt and the local context.

8. The computer-implemented method of claim 7, wherein:

the natural language query comprises text; and the local context is concatenated in plain text with the natural language query.

9. The computer-implemented method of claim 7, wherein the local context comprises at least one of:

a recent activity history comprising previous queries input by the user and corresponding responses generated by the assistant LLM during a dialog session;

geographical location data;

site visits;

recent documents from a private corpus; or recent user history information associated with the natural language query.

10. A computer-implemented method executed on data processing hardware that causes the data processing hardware to perform operations comprising:

receiving a natural language query from a user that solicits a response from an assistant large language model (LLM);

processing the natural language query to identify, from a log of refinement queries each previously input by the user for instructing the assistant LLM to refine a corresponding previous response generated by the assistant LLM, a preferred refinement query that is relevant to the natural language query;

prompting, using the natural language query and the preferred refinement query identified as being relevant to the natural language query, the assistant LLM to generate a personalized response to the natural language query; and providing, for output from a user device, the personalized response to the natural language query, wherein:

each corresponding refinement query in the log of refinement queries comprises a respective confidence value assigned to the corresponding refinement query; and prompting the assistant LLM to generate the personalized response to the natural language query comprises:

determining the respective confidence value threshold assigned to the preferred refinement query satisfies a confidence threshold;

based on determining the respective confidence value assigned to the preferred refinement query satisfies the confidence value threshold, structuring the natural language query and the preferred refinement query into a natural language composite prompt, the natural language composite prompt specifically formulated for instructing the assistant LLM to generate the personalized response to the natural language query; and issuing, for input to the assistant LLM, the natural language composite prompt to cause the assistant LLM to generate the personalized response to the natural language query.

11. The computer-implemented method of claim 10, wherein the natural language composite prompt comprises a single sentence.

12. A system comprising:

data processing hardware; and memory hardware in communication with the data processing hardware, the memory hardware storing instructions that when executed on the data processing hardware cause the data processing hardware to perform operations comprising:

receiving a natural language query from a user that solicits a response from an assistant large language model (LLM);

processing the natural language query to identify, from a log of refinement queries each previously input by the user for instructing the assistant LLM to refine a corresponding previous response generated by the assistant LLM, a preferred refinement query that is relevant to the natural language query;

prompting, using the natural language query and the preferred refinement query identified as being relevant to the natural language query, the assistant LLM to generate a personalized response to the natural language query; and providing, for output from a user device, the personalized response to the natural language query, wherein prompting the assistant LLM to generate the personalized response to the natural language query comprises:

structuring the preferred refinement query into a refinement prompt, the refinement prompt specifically formulated for the assistant LLM to personalize base responses generated by the assistant LLM;

structuring a composite prompt by concatenating the natural language query with the refinement prompt; and issuing, for input to the assistant LLM, the composite prompt to cause the assistant LLM to:

generate a base response to the natural language query, the base response not personalized for the user; and augment the base response to convey personal preferences specified by the refinement prompt, wherein the personalized response comprises the augmented base response.

13. The system of claim 12, wherein receiving the natural language query comprises:

receiving audio data characterizing an utterance of the natural language query spoken by the user and captured by the user device; and performing speech recognition on the audio data to generate a textual representation of the natural language query spoken by the user.

14. The system of claim 12, wherein providing the personalized response to the natural language query comprises providing, for output from the user device, response content comprising both the personalized response and the base response to the natural language query.

15. The system of claim 12, wherein structuring the preferred refinement query into the refinement prompt comprises structuring the preferred refinement query into the refinement prompt by appending natural language personalized response instructions to a textual representation of the preferred refinement query.

16. The system of claim 12, wherein augmenting the base response comprises at least one of:

highlighting information or results in the base response;

annotating text in the base response;

underlining or modifying text in the base response; or adjusting a formatting of the base response.

17. The system of claim 12, wherein:

each corresponding refinement query in the log of refinement queries is paired with a respective previous query embedding of a corresponding previous query input by the user that prompted the assistant LLM to generate the corresponding previous response that was refined by the corresponding refinement query, the respective previous query embedding of each corresponding previous query projected into an embedding space; and processing the natural language query to identify the preferred refinement query that is relevant to the natural language query comprises:

embedding, using a neural network, the natural language query into a query embedding;

identifying, from the previous query embeddings projected into the embedding space, a closest one of the previous query embeddings to the query embedding within the embedding space; and selecting the refinement query in the log of refinement queries that is paired with the identified closest one of the previous query embeddings as the preferred refinement query.

18. The system of claim 12, wherein the operations further comprise:

receiving local context associated with the natural language query, wherein structuring the composite prompt by concatenating the natural language query with the refinement prompt further comprises structuring the composite prompt by concatenating the natural language query with the refinement prompt and the local context.

19. The system of claim 18, wherein:

the natural language query comprises text; and the local context is concatenated in plain text with the natural language query.

20. The system of claim 19, wherein the local context comprises at least one of:

a recent activity history comprising previous queries input by the user and corresponding responses generated by the assistant LLM during a dialog session;

geographical location data;

site visits;

recent documents from a private corpus; or recent user history information associated with the natural language query.

21. A system comprising:

data processing hardware; and memory hardware in communication with the data processing hardware, the memory hardware storing instructions that when executed on the data processing hardware cause the data processing hardware to perform operations comprising:

receiving a natural language query from a user that solicits a response from an assistant large language model (LLM);

processing the natural language query to identify, from a log of refinement queries each previously input by the user for instructing the assistant LLM to refine a corresponding previous response generated by the assistant LLM, a preferred refinement query that is relevant to the natural language query;

prompting, using the natural language query and the preferred refinement query identified as being relevant to the natural language query, the assistant LLM to generate a personalized response to the natural language query; and providing, for output from a user device, the personalized response to the natural language query, wherein each corresponding refinement query in the log of refinement queries comprises a respective confidence value assigned to the corresponding refinement query, and wherein prompting the assistant LLM to generate the personalized response to the natural language query comprises:

determining the respective confidence value threshold assigned to the preferred refinement query satisfies a confidence threshold;

based on determining the respective confidence value assigned to the preferred refinement query satisfies the confidence value threshold, structuring the natural language query and the preferred refinement query into a natural language composite prompt, the natural language composite prompt specifically formulated for instructing the assistant LLM to generate the personalized response to the natural language query; and issuing, for input to the assistant LLM, the natural language composite prompt to cause the assistant LLM to generate the personalized response to the natural language query.

22. The system of claim 21, wherein the natural language composite prompt comprises a single sentence.

\* \* \* \* \*